United States Patent
Herrell (10) Patent No.: US 7,301,667 B1
(45) Date of Patent: Nov. 27, 2007

(54) IMAGE TILING IN INK JET PRINTING SYSTEMS

(75) Inventor: Edwin J. Herrell, Grafton, NH (US)

(73) Assignee: Electronics for Imaging, Inc., Foster City, CA (US)

( * ) Notice: Subject to any disclaimer, the term of this patent is extended or adjusted under 35 U.S.C. 154(b) by 956 days.

(21) Appl. No.: 10/430,801

(22) Filed: May 6, 2003

Related U.S. Application Data (60) Provisional application No. 60/378,315, filed on May 6, 2002.

(51) Int. Cl.
   *H04N 1/40* (2006.01)
(52) U.S. Cl. ................................... 358/1.18; 358/1.1
(58) Field of Classification Search ............... 358/1.9, 358/2.1, 3.2, 1.1, 1.15–1.18, 3.26–3.27, 462, 358/3.02
   See application file for complete search history.

(56) References Cited

U.S. PATENT DOCUMENTS

| 6,082,619 A | 7/2000 | Ma et al. |
| 6,229,544 B1 * | 5/2001 | Cragun ................... 345/418 |
| 6,359,695 B1 * | 3/2002 | Takahashi et al. ............ 358/1.1 |

FOREIGN PATENT DOCUMENTS

| EP | 0 577 250 | 7/1998 |
| EP | 0 647 058 B1 | 4/1999 |
| JP | 2093515 | 4/1990 |
| JP | 09233308 | 9/1997 |
| JP | 09300731 | 11/1997 |

OTHER PUBLICATIONS

Rodney, A., "Ultimatte Knockout", Revolutionary New Masking Software, *PEI*, Dec. 1998, pp. 18-21.
Sellers, D., "Lightning Draw GX", *Computer Artist*, Apr./May 1996, pp. 51-52.
Guéziec, A., et al., "Cutting and Stitching: Converting Sets of Polygons to Manifold Surfaces", *IEEE*. vol. 7. No. 2, Apr.-Jun. 2001, pp. 136-151.
"Guts Power Money Passion & Hard Numbers", *Info World*, Mar. 27, 1995, pp. 22, 37.
Simon, B., "Image Editing Software, PhotoFinish 2.0: Zoom In On Business Users", 1 page, no date given.
Lam, S. W., et al., "Gray Scale Character Recognition Using Boundary Features", *SPIE* vol. 1661 (1992), pp. 98-105.
Image Sciences: Image Science announces "Docu Word;" Innovative Windows-based text composition editor/engine dynamically eliminates unnecessary blank space for variable data (May 9, 1996) (Abstract).

(Continued)

*Primary Examiner*—Thomas R. Lee
*Assistant Examiner*—Stephen Brinich
(74) *Attorney, Agent, or Firm*—James Trosino (57) ABSTRACT

A system or method of removing whitespace between tiled or repeated patterns generated during a printing operation. The system takes an initial image and determines if there exist extraneous bits of whitespace around the edge of actual image. Once this information is established, the printer application program uses that information to alter the tiled output accordingly to produce a seamless image with repeated or tiled patterns of the actual image.

15 Claims, 4 Drawing Sheets

OTHER PUBLICATIONS

Linderholm, Owen, "Pretty As A Picture", TechWeb (Dec. 1, 2000), www.techweb.com.

Livingston, Brian, "Resizing bit maps without 'jaggies' just got a lot easier." (WexTech Systems' Smooth Scaling image processing software)(Windows Manager)(Column), *InfoWorld*, 17(13):37 (Mar. 27, 1995) (Abstract).

Borzo, Jeanette, "Graphics vendors showcase wide range of enhancements, products for Windows." (Media Cybernetics' Halo Desktop Imager, Ray Dream Inc.'s JAG for Windows, Micrographx Inc.'s Designer and Windows Draw graphics packages)(Windows World trade show) (Product Announcement), InfoWorld, 14(15):15 (Apr. 13, 1992) (Abstract).

"Data Translation announces its DT-IDL" (MicroVax III image processing software package)(project announcement), Computer & Software News, 5(47):104 (Nov. 23, 1987) (Abstract).

* cited by examiner

IMAGE TILING IN INK JET PRINTING SYSTEMS

RELATED APPLICATION

This application claims the benefit of U.S. Provisional Application No. 60/378,315, filed on May 6, 2002, the entire teachings of which are incorporated herein by reference.

BACKGROUND

In certain large-scale printing systems, printheads are used to eject ink onto a substrate to create the desired image, for example, on substrates such as museum displays, billboards, sails, bus boards, and banners. In some of these printing systems, the printheads receive ink from an ink supply or reservoir and use so-called drop on demand ink jet process. With this type of process, ink is ejected from one or more nozzles of the printheads only when a piezoelectric crystal in the printhead is actuated. In particular, the piezoelectric crystal creates a pulse in the ink so that the ink expels through the nozzle as a droplet. To create the image, a carriage which holds one or more printheads scans or traverses across the substrate while the printheads deposit ink as the substrate moves. In some other systems, the substrate moves underneath a stationary set of printheads as the printheads deposit ink.

Generally, the printheads are under the direction of a controller or CPU. Stored within the memory of the controller or CPU is digital information related to the desired image. The controller operates with a software application that instructs the printheads to deposit ink in a particular sequence based on the stored digital information to generate a predetermined image on the substrate.

In some printing applications, a particular pattern is repeated within the image both across the substrate, as well as down the length of the substrate. However, the amount of digital information that would have to be stored in memory to produce the entire image can be quite large. Therefore, some have proposed storing information related only to the particular pattern, which would require significantly less memory than that required for the entire image, and then using a programmed image processing application to repeat the pattern in a tiling process.

However, because of certain constraints of image processing applications generally used to generate the images, as well as limitations in the raster image processor (RIP) applications that convert these images to a format the printer can understand, print-ready images can contain extraneous whitespace around the edges of the images. This whitespace, or dead space, around the image does not contain actual valid image data. In general, this does not pose a problem if only a single image is printed. Unfortunately, in printing applications in which it is desirable to repeat the image, for example, a repeated pattern on wall paper, curtains, floor tiling, or any other printed images with repeated patterns, as in a tiling operation, this whitespace shows up very clearly as "seams" in the final generated product. This unsightly seam is visible to an observer even when the whitespace is made of only one or two bits of blank data.

SUMMARY

In view of the above, in particular printing applications in which an image pattern is repeated in an image (tiling), it is desirable to somehow remove the whitespace around the edges of the pattern. Accordingly, when the pattern is repeated across and down the length of the substrate, the final image is seen by an observer as a series of high quality seamlessly tiled or repeated patterns.

One embodiment of the present invention provides a system or method of removing whitespace between tiled or repeated patterns generated during a printing operation. The process takes digital information of an initial image and determines if there exist extraneous bits of whitespace around the edge of the image. Once this information is established, the printer application program uses that information to alter the tiled output accordingly to produce a seamless image with repeated or tiled patterns.

In a further aspect of the invention, a system or method for generating a pixel image with repeated patterns includes identifying whitespace around an initial image which, when repeated, appears as seams in repeated actual images, and then removing the whitespace to produce an actual image or pattern. The method tiles or repeats the actual image so that no seams appear between the repeated actual images.

Embodiments of this aspect can include one or more of the following features. Using digital information of an initial image, the identifying process includes initializing image edges to obtain a raw image size of the initial image. The identifying can include scanning the image for whitespace for a particular edge. Optionally, if whitespace exists for the particular edge, that edge is moved towards an opposite side by one pixel of the image. The edge is then rescanned for whitespace, and that process continues until valid data is achieved.

In some embodiments, a method is provided for determining if the edge has moved to the opposite side, in which case, the image contains no valid data. That is, the image is all whitespace. The method also determines an edge of the actual image if there is no whitespace. The particular edge can be a top edge, a bottom edge, a left edge, or a right edge. In certain embodiments, if the top edge, the bottom edge, the left edge, and the right edge of the actual image has been determined, the method generates whitespace data.

In particular embodiments, the method generates raw colorplane data prior to identifying the whitespace. Additionally, the system scans for whitespace data for each color of the colorplane data.

In certain embodiments, removing the whitespace includes generating whitespace data, and the tiling includes tiling raw data and adjusting the raw data with the whitespace data to generate data pertaining to the actual image. In particular embodiments, the adjusted data is sent to a printer after the tiling of the data.

In another aspect of the invention, a system includes preprocessing an image file, and generating raw colorplane data from the preprocessed image file. The system includes determining whitespace around an initial image based on the colorplane data, and generating whitespace data. The system then tiles the preprocessed image file by adjusting for whitespace based on the whitespace data to create tiling data for an actual image. The tiling data is sent to a printer which prints tiled actual images based on the tiling data, such that adjacent tiled actual images have no whitespace between the images.

Some embodiments may have one or more of the following advantages. The process achieves high quality printing results when tiling (or step and repeat) an image pattern in a printing operation. The process requires enough memory for only a single pattern and not the entire final image with repeated patterns. The process eliminates all undesirable whitespace around an image, even if the whitespace is one or two bits wide. Moreover, when the printing program utilizes the process of the present invention to remove whitespace, the users of the process do not have to concern themselves with making a whitespace-free original image in whatever applications they are using, which, in some cases, is impossible to do because the application pads the data to various byte boundaries.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. The embodiments are provided by way of example and not as limitations of the invention.

In many large-scale or wide-format printing operations, images are printed on a variety of flexible substrates. Typical flexible substrates include polyvinyl chloride (PVC), reinforced vinyl, and fabrics or textile materials. Some of these print operations can also print on non-flexible substrates, such as, for example, metals, glass, and plastics. The present invention is directed to printing operations which print repeated or tiled patterns on both flexible and non-flexible substrates. The process can be implemented in a so called drop on demand ink jet printer such as that described in greater detail in U.S. application Ser. No. 09/834,999, filed Apr. 13, 2001, the entire teachings of which are incorporated here in by reference. In brief, a series of printheads eject ink from respective nozzles as directed by a controller or CPU onto a substrate while a carriage that holds the printheads traverses across the substrate.

Typically, different colored inks are used to create the desired final image. For instance, black, yellow, cyan, and magenta colored inks are commonly employed alone or in combination to generate the image. Furthermore, in certain applications additional colored inks, such as, light black, light yellow, light cyan, and light magenta colored inks are used as well, for example, as described in greater detail in U.S. patent application Ser. No. 10/100,281, entitled "Multi-Color, Multi-Speed Printing Apparatus," by Aschman et al. filed Mar. 15, 2002, the entire contents of which are incorporated herein by reference.

Figure 1:
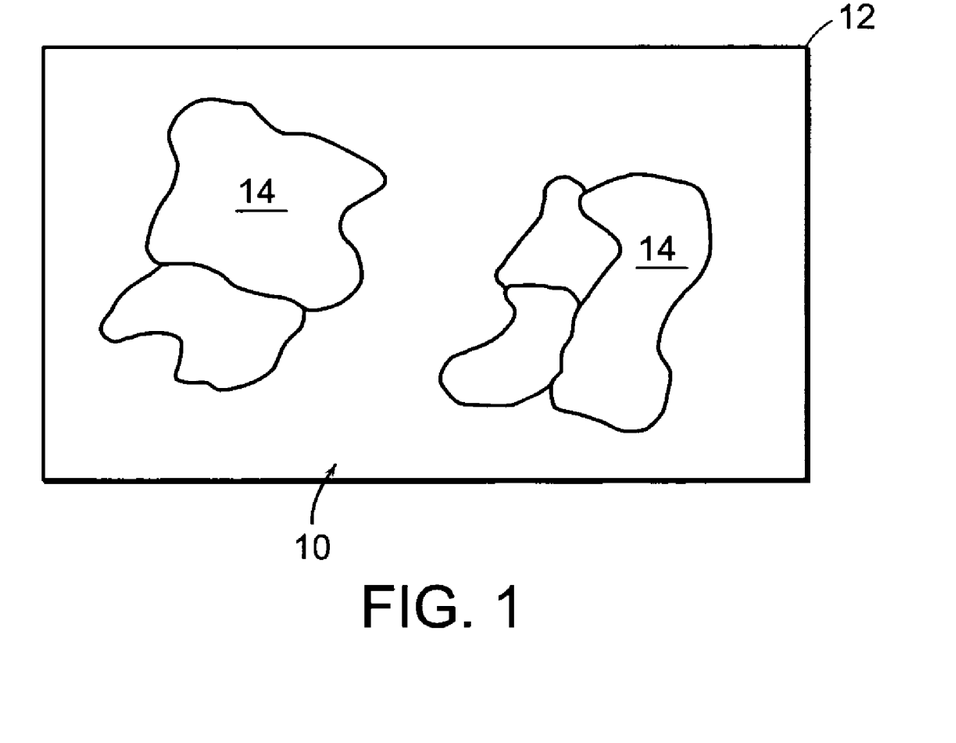
FIG. 1 is a schematic illustration of an image created with a typical ink jet printing system.

Thus, in addition to these four to eight base colors, various colors of a particular image are created by combining these base colors to produce a desired image 10 on a substrate 12, such as depicted in FIG. 1. By way of example, the green region 14 of the image 10 is created by combining yellow and cyan colored inks. For instance, in a typical printing operation, either the yellow or cyan colored ink is first ejected from a respective printhead and deposited on the substrate, and then the other colored ink is ejected from its respective printhead and deposited on top of the first deposited ink.

In general, most printing systems employ image processing software to generate the images. That is, the controller uses to the software and the digital information related to a particular image to direct the printheads to eject the different colored inks with in a desired sequence to create the image on the substrate. With many image processing applications, a print-ready image is surrounded by whitespace, or dead space, which is a region around the image that does not contain any information related to the image. For example, for certain images printed on a substrate, this whitespace 22 is identified in a left-hand initial N×M pixel image 19 of FIG. 2A as the region extending from the edge of an actual P×Q actual image 20, indicated by the dashed lines 24 where $P \leq N$ and $Q \leq M$, which does not actually appear in the image, and the solid lines 26. As such, the dashed lines 24 identify the edges of the actual image 20, while the solid lines 26 identify the edges of the initial image 19 such that when the initial image 19 is printed on a white substrate, for example, the whitespace region 22 between the dashed lines 24 and the solid lines 26 appear as a white border surrounding the actual image 20.

As just mentioned, the whitespace 22 does not contain actual valid image data, but is merely the result of the various constraints of the image processing application. In addition, the whitespace occurs because of limitations in the raster image processor (RIP) applications that convert these images to a format the printing system can understand. That is, the RIP application converts the original graphic image file into a filed encoded with ink information.

The original images can be generated by a number of applications, for example, Adobe Photoshop, and usually the image data is saved in an RGB (red/green/blue) or similar format. In the RIP application, the user loads this image data of the original image file, and then sets up the desired environment, for example, a destination four-color file (cyan/magenta/yellow/black) at 360 dots per inch (dpi). The RIP application then colormatches and re-encodes the image file as a series of color planes, one for each ink color, where each bit in each color plane represents whether a given dot is on or off for that color. Collectively, this data is referred to as a "colorplane data". By way of example, a one inch by one inch image created with the four base colors cyan/magenta/yellow/black at 360 dpi would result in a RIP image with 360 rows, four color planes, with 45 bytes (or 360 bits) per plane. Typically, for the illustrated embodiment, the colormatching needs to be very precise and is dependent on the ink. Accordingly, the RIP application must generate a RIP image that matches as close as possible to the original image.

Figure 2A:
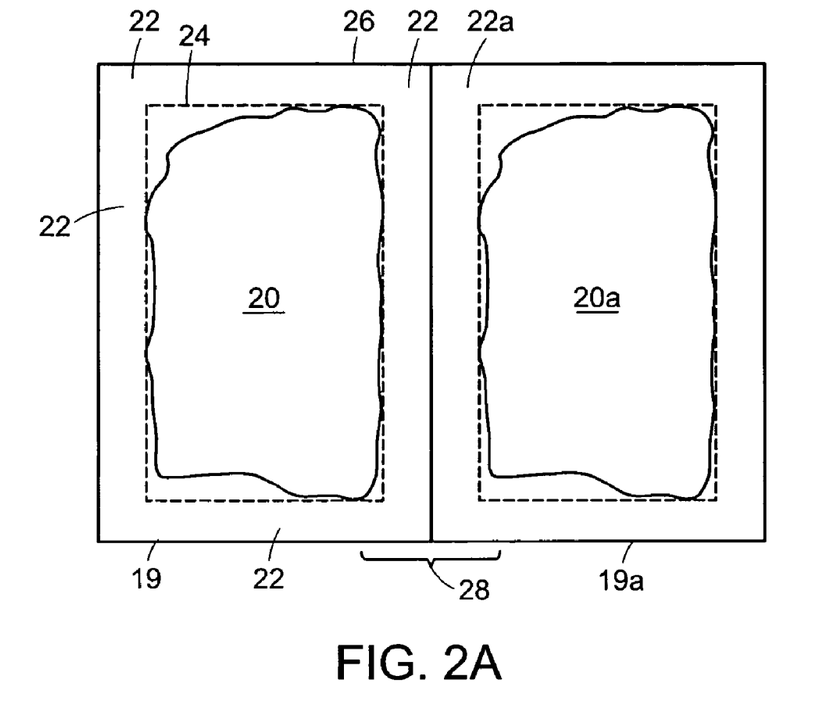
FIG. 2A is schematic of a printed image with tiled patterns having whitespace between the patterns.

If a particular application requires only printing a single image, this whitespace does not present a problem in most instances. However, if the left hand initial image 19 is tiled with an identical initial image 19a to the right of the image 19, the whitespace to the right 22 of the actual image 20 and that to the left 22a of the actual image 20a will appear as a seam 28 in the image printed on the substrate. (Note that the solid line between the two images 20 and 20a is merely shown for the purpose of illustrating the boundaries of the two images, and would not appear on the actual printed image.) Also note that the width of the seam 28 shown in FIG. 2A is most likely exaggerated, since the seam 28 in typically tiled images contains as few as one or two bits of blank data. However, even if the seam 28 is only one or two bits of blank data wide, the seam 28 will still appear as an unsightly white line to an observer, for example, if the substrate itself is white, that separates the lefthand actual image 20 from the righthand actual image 20a.

Figure 2B:
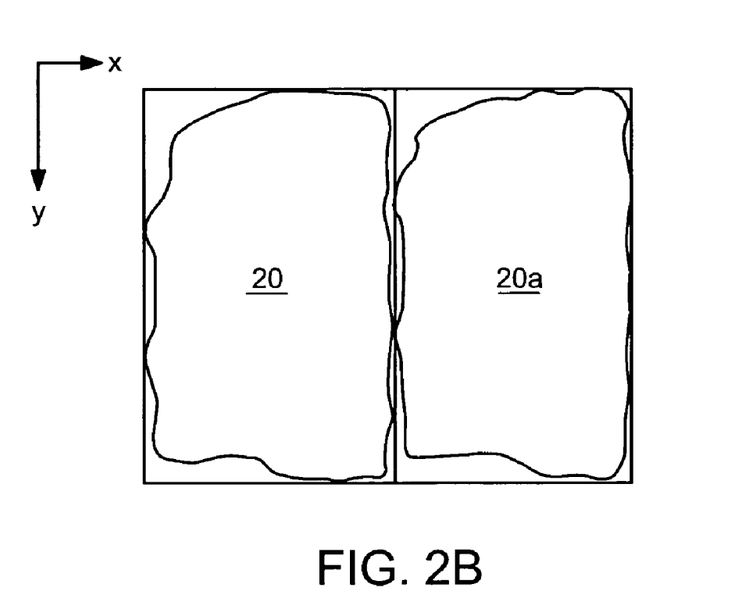
FIG. 2B is a schematic of a printed imaged with tiled patterns having whitespace removed between the patterns in accordance with the invention.

Referring now to FIG. 2B, there is shown how the two identical actual images 20 and 20a are tiled when using an image process 100 (FIG. 3) in accordance with the present invention. As an overview of algorithm of the process 100, the algorithm identifies the whitespace 22 of the initial image 19 surrounding the actual image 20, removes this whitespace 22, and then repeats the actual image 20 in the x direction, as well as the y direction, such that there are no seams which appear between the tiled or repeated images. Thus, in the final image, the actual images 20 appear as a repeated pattern across the substrate, as well as down the length of the substrate.

Particular details of algorithm for the process 100 are described with reference to FIG. 3.

The process 100 begins by taking an image file in step 102 with digital information or data of an actual image 20 to be printed in a repeated or tiled manner, and preprocessing the image file data in step 104. Accordingly, the process 100 only requires a sufficient amount of memory to store data associated with the actual image that is to be repeated in the final image, and not data for the entire final image.

After preprocessing the image file in step 104, the process 100 generates raw colorplane data for each color of the actual image 20 in step 106.

Figure 4:
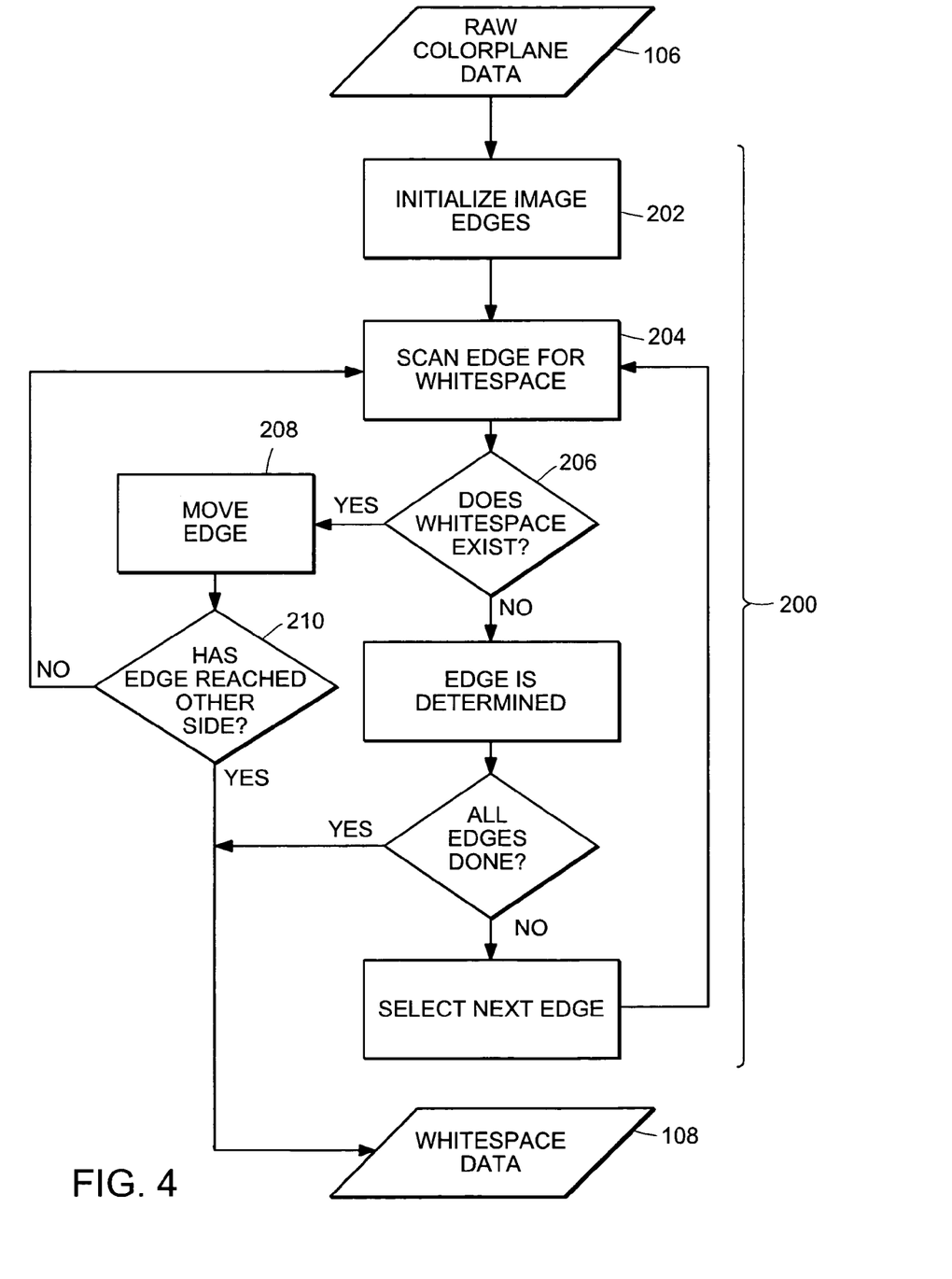
FIG. 4 is a flow diagram illustrating a sequence of steps of a sub-process of the sequence of steps of FIG. 3 for determining whitespace between tiled actual images in accordance with the invention.

Next, for each color of the raw colorplane data, the process 100 identifies the whitespace 22 surrounding the actual image 20 in the whitespace identification step or subprocess 200, which is described in greater detail in FIG. 4.

Referring now to FIG. 4, in step 202, the subprocess 200 initializes the image edge for the initial image 19. That is, the subprocess 200 initializes the top, bottom, left, and right edges of the initial image 19 to a raw image size. Hence, the raw image includes the desired actual image 20 to be repeated along with the whitespace 22 surrounding the actual image. For example, the boundary 26 of the image 19 of FIG. 2A would identify the extent of the raw image in the present context. Note that if there is no whitespace surrounding the actual image, then the raw image size will be the resultant image size. That is, the raw image size and the size of the actual image would be the same.

Next, from the top, bottom, left, or right edge, the subprocess 200 in step 204 looks at each pixel for each colorplane on that edge, which is a line one pixel wide extending from the image top to the image bottom, or the image left to the image right, and checks if the bit is set, i.e., there is ink. If there are any bits set along that line, then that edge contains valid image data.

Then the subprocess 200, in step 206, checks the flag set in step 204. If there is no valid data in that edge, then the edge moves inward by one pixel and is scanned again for whitespace, as illustrated by the yes arrow from step 206 and the no arrow from step 210. Hence, if whitespace does exist, then in step 208, the subprocess 200 moves the particular edge by one pixel towards the opposite side. That edge is rescanned for whitespace, and the process continues until valid data is reached.

Subsequently, if the process 200 decides in step 210 that if the actual image is completely blank, in which case the edge will have moved all the way across the image to the opposite side of the image, the subprocess 200 exits to step 108 of the process 100. That is, if the particular edge reaches the opposite side, the image contains no valid data, i.e., it is all whitespace.

Otherwise, if the image is not blank, then the subprocess 200 returns to step 204 and determines again if there is any remaining whitespace for the particular edge. The loop continues for the particular edge until the subprocess 200 determines in the step 206 that no whitespace exists, at which point the subprocess 200 has identified one of the edges of the actual image in step 212.

Next, in step 214, the subprocess 200 determines if all of the actual edges 24 have been identified. If not, then in step 216, the subprocess 200 selects the next desired edge (top, bottom, left, or right) for scanning and returns to step 204. After the four edges (top, bottom, left, and right) have been determined, for example, as identified by the dashed line 24 surrounding the actual image 20 of FIG. 2A, the subprocess 200 is complete and the edges 24, for instance, define the actual image size without whitespace.

Using data from the subprocess 200, the process 100 generates whitespace data in step 108. Next in step 110, the process 100 tiles the raw image data and adjusts for whitespace of the raw image using the information determined in step 108. In essence, the process 100 removes the whitespace surrounding the actual image 20.

The raw tiled data is then sent to the printer in step 112, where a final image is printed on a substrate, such as the images 20 and 20a shown in FIG. 2B. Again, only two repeated actual images 20 and 20a are shown in FIG. 2B, however, typically, the actual image 20 is repeated a number of times in the x-direction, as well as in the y-direction. Thus, with the whitespace having been removed, the actual image 20 appears as a repeated pattern in the final image printed on a substrate without any unsightly seams appearing between the repeated images 20.

Furthermore, as mentioned earlier, the process 100 requires only enough memory hold data or digital information related to a single actual image, rather than that for an entire final image with many repeated actual images.

It will be apparent to those of ordinary skill in the art that methods disclosed herein may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

Figure 3:
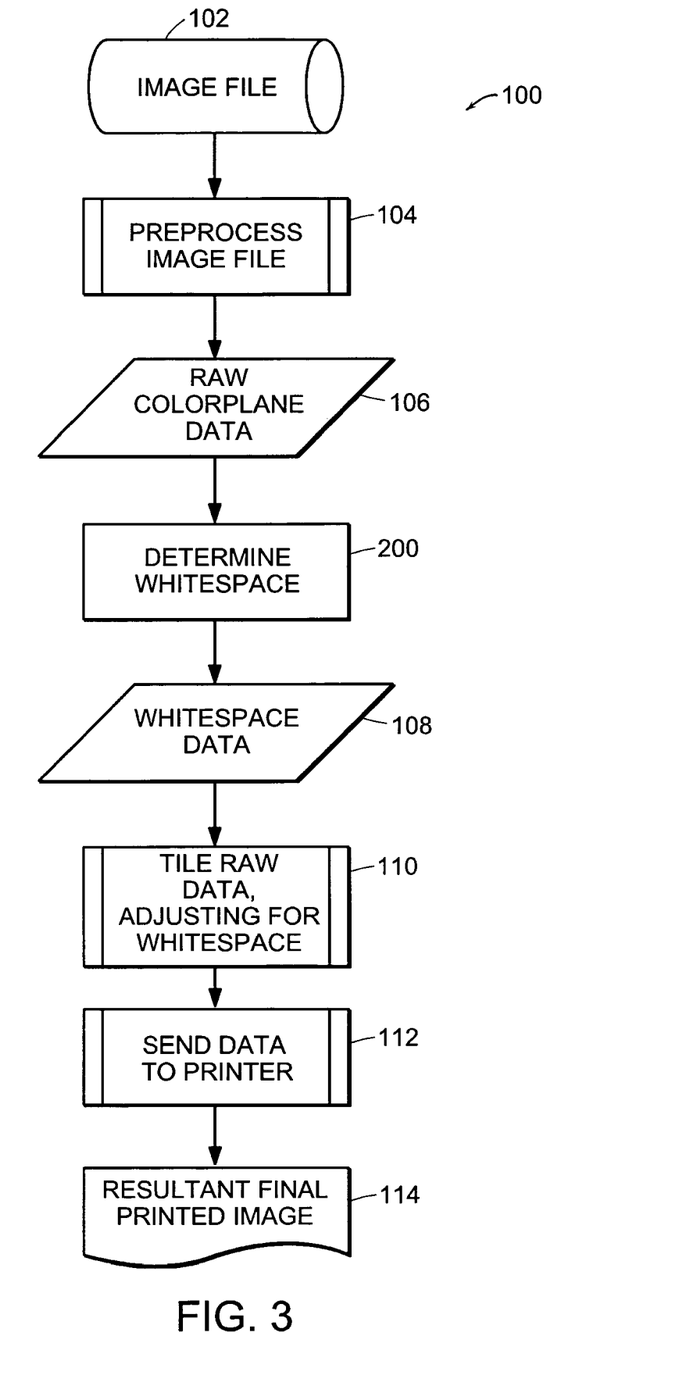
FIG. 3 is a flow diagram illustrating a sequence of steps for removing whitespace between tiled images in accordance with the invention.

An illustrated embodiment of the computer code for implementing the process of 100 of FIG. 3 and the subprocess 200 of FIG. 4 is attached as Appendix A. Although the attached code is written in C programming language, the process 100 and the subprocess 200 can be implemented with any other suitable computer language, such as, for example, C++, assembly, Java, Visual Basic, and Pascal.

While this invention has been particularly shown and described with references to preferred embodiments thereof, it will be understood by those skilled in the art that various changes in form and details may be made therein without departing from the scope of the invention encompassed by the appended claims.

```
/* The WhitespaceInfo structure will contain the final 'valid image data' information; an
inclusive rectangle of valid bits. For example, if the original image were 128×64
pixels, and it had 3 pixels of whitespace on the left and right edges and 2 pixels of
whitespace on the top and bottom edges, the WhitespaceInfo structure would acquire the
values: dwLeft=3, dwRight=124, dwTop=2, dwBottom=61 after a call to DetermineWhitespace.
(Note that a 128×64 pixel image will have initial values of 0, 127, 0, 63 since it's an
inclusive rectangle) */
typedef struct
{
    unsigned int dwLeft;
    unsigned int dwRight;
    unsigned int dwTop;
    unsigned int dwBottom;
} WhitespaceInfo;
/* The ImageInfo structure contains the original image data, already preprocessed and
split into its independent color planes.*/
typedef struct
{
        unsigned int dwX; /* Number of bytes in one given color plane (effectively width
                            of image, divided by 8, rounded up)*/
        unsigned int dwY; /* Number of rows in image*/
        unsigned short wColorPlanes;        /* Number of color planes in image (e.g. 4-
color, 8-color)*/
        unsigned char** pData; /* Actual pixel data - first array subscript is color plane,
second is location*/
} ImageInfo;
void ScanForTopEdge (WhitespaceInfo* pWI, ImageInfo* pII)
{
    unsigned int x, y, offset;
    unsigned short p;
    for (y=pWI->dwTop;y<=pwI->dwBottom;y++) /* loop rows from top downward 'til valid
data found*/
        {
        offset = y*pII->dwX; // beginning of row 'y'
        for (x=offset;x<offset+pII->dwX;++x) // loop through pixels in row
            for (p=0;p<pII->wColorPlanes;++p) // check each color plane
                if (pII->pData[p] [x])
                {
                    pWI->dwTop = y; /* data found, set top edge accordingly*/
                    return;
                }
        }
        pWI->dwTop = pII->dwY; // set out of range if null image
}
void ScanForBottomEdge (WhitespaceInfo* pWI, ImageInfo* pII)
{
    unsigned int x, y, offset;
    unsigned short p;
    for (y=pWI->dwBottom;y>=pwI->dwTop;y- -) /* loop rows from bottom upward 'til valid
data found*/
        {
        offset = y*pII->dwX;    // beginning of row 'y'
        for (x=offset;x<offset+pII->dwX;++x) // loop through pixels in row
            for (p=0;p<pII->wColorPlanes;++p) // check each color plane
                if (pII->pData[p] [x])
                {
                    pWI->dwBottom = y; /* data found, set bottom edge accordingly*/
                    return;
                }
        }
        pWI->dwBottom = 0;    // set out of range if null image
}
void ScanForLeftEdge (WhitespaceInfo* pWI, ImageInfo* pII)
{
    unsigned int x, y;
    unsigned short p;
    unsigned char b, c;
    unsigned char ucWhiteBits = 8;
    for (x=pWI->dwLeft; (x<=pWI->dwRight) && (ucWhiteBits==8) ;++x)    /* loop columns from
left rightward 'til valid data found*/
        for (y=pWI->dwTop;y<=pWI->dwBottom;++y)    // loop through pixels in column
            for (p=0;p<pII->wColorPlanes;++p) // check each color plane
                if (pII->pData [p] [y*pII->dwX+x])
                {
```

-continued

```
                c = pII->pData[p] [y*pII->dwX+x]; /* data found, check to see at which
bit of the byte the data begins*/
                    for (b=0;b<=ucWhiteBits; ++b)
                        if (c & 0x80)
                            ucWhiteBits = b;   // set the 'leftmost' bit once data found
                        else
                            c <<= 1;
                }
    pWI->dwLeft = (x << 3) + ucWhiteBits;   // set actual left edge accordingly
}
void ScanForRightEdge (WhitespaceInfo* pWI, ImageInfo* pII]
{
    unsigned int x, y;
    unsigned short p;
    unsigned char b, c;
    unsigned char ucWhiteBits = 8;
    for (x=(pWI->dwRight>>3) ; (x>=(pWI->dwLeft3)) && (ucWhiteBits==8) ;- -x) /* loop
columns from right leftward 'til valid data found*/
        for (y=pWI->dwTop;y<=pWI->dwBottom;++y) // loop through pixels in column
            for (p=0;p<pII->wColorPlanes;++p) // check each color plane
                if (pII->pData[p] [y*pII->dwX+x])
                {
                    c = pII->pData[p] [y*pII->dwX+x]; /* data found, check to see at which
bit of the byte the data begins*/
                    for (b=0;b<=ucWhiteBits;++b)
                        if (c & 0x01)
                            ucWhiteBits = b; /* set the 'leftmost' bit once data found -
made 'rightmost' in final calculation*/
                        else
                            c >>= 1;
                }
    pWI->dwRight = (x << 3) + 7 - ucWhiteBits;    // set actual right edge accordingly
}
void DetermineWhitespace (WhitespaceInfo* pWI, ImageInfo* pII)
{
    // Initialize edges - set to outside edge of entire image
    pWI->dwLeft = 0;
    pWI->dwRight = (pII->dwX << 3) - 1;
    pWI->dwTop = 0;
    pWI->dwBottom = pII->dwY - 1;
    // Calculate top and bottom edges
    ScanForTopEdge(pWI, pII);
    ScanForBottomEdge(pWI, pII);
    // Calculate left and right edges
    ScanForLeftEdge(pWI, pII);
    ScanForRightEdge(pWI, pII);
    /* At this point, the WhitespaceInfo structure will hold image dimensions with
whitespace removed. If pWI->dwBottom= =0 or pWI->dwTop==pII->dwY at this point, then the
image is all whitespace.*/
}
```

What is claimed is:

1. A method of removing whitespace around a pixel image, comprising the steps of:
   identifying whitespace around an initial image which, when repeated, appears as seams in repeated actual images, wherein identifying includes initializing image edges to obtain a raw image size of the initial image;
   removing the whitespace to produce an actual image; and
   tiling the actual image so that the actual image is repeated without seams appearing between the repeated actual images.

2. The method of claim 1, wherein the step of identifying includes scanning the image for whitespace for a particular edge.

3. The method of claim 2, wherein if whitespace exists for the particular edge, that edge is moved towards an opposite side by one pixel of the image.

4. The method of claim 3, further comprising determining if the edge has moved to the opposite side indicating that the image is all whitespace.

5. The method of claim 2, further comprising determining an edge of the actual image if there is no whitespace.

6. The method of claim 2, wherein a particular edge is a top edge, a bottom edge, a left edge, or a right edge.

7. The method of claim 6, wherein if the top edge, the bottom edge, the left edge, and the right edge of the actual image has been determined, further comprising generating whitespace data.

8. The method of claim 2, further comprising generating raw colorplane data prior to the identifying.

9. The method of claim 8, wherein scanning the image for whitespace data is performed for each color of the colorplane data.

10. A method of removing whitespace around a pixel image, the method comprising:
    identifying whitespace around an initial image which, when repeated, appears as seams in repeated actual images;
    removing the whitespace to produce an actual image, wherein removing include generating whitespace data; and tiling the actual image so that the actual image is repeated without seams appearing between the repeated actual images, wherein tiling includes tiling raw data and adjusting the raw data with the whitespace data to generate data pertaining to the actual image.

11. The method of claim 10, further comprising sending the adjusted data to a printer after the tiling of the data.

12. A method of removing whitespace around a pixel image, comprising:
preprocessing an image file;
generating raw colorplane data from the preprocessed image file;
determining whitespace around an initial image based on the colorplane data;
generating whitespace data;
tiling the preprocessed image file by adjusting for whitespace based on the whitespace data to create tiling data for an actual image;
sending the tiling data to a printer; and
printing tiled actual images based on the tiling data, adjacent tiled actual images having no whitespace between the images.

13. A computer program product for removing whitespace around a pixel image, the computer program product comprising a computer usable medium having computer readable program code thereon, comprising:
program code for identifying whitespace around an initial image which, when repeated, appears as seams in repeated actual images, wherein the program code for identifying includes program code for initializing image edges to obtain a raw image size of the initial image;
program code for removing the whitespace to produce an actual image; and
program code for tiling the actual image so that the actual image is repeated without seams appearing between the repeated actual images.

14. A system for removing whitespace around a pixel image, comprising:
means for identifying whitespace around an initial image, which, when repeated, appears as seams in repeated actual images, wherein the means for identifying includes means for initializing image edges to obtain a raw image size of the initial image;
means for removing the whitespace to produce an actual image; and
means for tiling the actual image so that the actual image is repeated without seams appearing between the repeated actual image.

15. The system of claim 14, comprising:
means for printing tiled actual images based on the tiling data, adjacent tiled actual images having no whitespace between the images.

* * * * *